(12) United States Patent
Hare Ram Singh et al.

(10) Patent No.: US 12,001,296 B1
(45) Date of Patent: Jun. 4, 2024

(54) CONTINUOUS LOCK-MINIMAL CHECKPOINTING AND RECOVERY WITH A DISTRIBUTED LOG-BASED DATASTORE

(71) Applicant: Amazon Technologies, Inc., Seattle, WA (US)

(72) Inventors: Abhiram Kumar Hare Ram Singh, Billerica, MA (US); Theodore Allen Carroll, Seattle, WA (US); Nathaniel Vaughan Langman, Manchester by the Sea, MA (US); Michael Anthony Sciscenti, Laurel, MD (US)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 17/937,013

(22) Filed: Sep. 30, 2022

(51) Int. Cl.
*G06F 11/14* (2006.01)

(52) U.S. Cl.
CPC ...... *G06F 11/1464* (2013.01); *G06F 11/1451* (2013.01); *G06F 11/1469* (2013.01)

(58) Field of Classification Search
CPC ............. G06F 11/1464; G06F 11/1451; G06F 11/1469
See application file for complete search history.

(56) References Cited

U.S. PATENT DOCUMENTS

| | | | | |
|---|---|---|---|---|
| 10,810,093 | B1* | 10/2020 | Tucek | H04L 41/30 |
| 11,803,448 | B1* | 10/2023 | Pani | G06F 9/5038 |
| 2017/0366624 | A1* | 12/2017 | Tsang | G06F 16/2379 |
| 2023/0129446 | A1* | 4/2023 | Bondurant | G06F 11/1425 |
| | | | | 711/154 |
| 2023/0244649 | A1* | 8/2023 | Helland | G06F 16/2272 |
| | | | | 707/741 |
| 2023/0393900 | A1* | 12/2023 | Lin | G06F 16/27 |

* cited by examiner

*Primary Examiner* — Edward J Dudek, Jr.
(74) *Attorney, Agent, or Firm* — Nicholson DeVos Webster & Elliott LLP

(57) ABSTRACT

Techniques for continuous lock-minimal checkpointing and recovery with a distributed log-based datastore are described. A continuous, fault-tolerant checkpoint process is run on a node in a cluster in a compute-optimized or memory-optimized manner, thereby checkpointing the in-memory replica state of the node to a durable checkpoint datastore. A node can partially restore its replica state by obtaining checkpoint data, which includes an identifier of a low-water mark in a journal shard. The node can attach to the journal shard using the low-mater mark as the point of attachment, enabling the node to finalize the restoration of the replica state to be current.

20 Claims, 11 Drawing Sheets

CONTINUOUS LOCK-MINIMAL CHECKPOINTING AND RECOVERY WITH A DISTRIBUTED LOG-BASED DATASTORE

BACKGROUND

Cloud provider networks enable users to use a variety of computing-related resources such as compute resources, storage resources, networking resources, and the like. One possible computing resource could be provided by a transactional eventing service implementing a distributed log-based append-only datastore.

BRIEF DESCRIPTION OF DRAWINGS

Various examples in accordance with the present disclosure will be described with reference to the drawings, in which.

DETAILED DESCRIPTION

Figure 1:
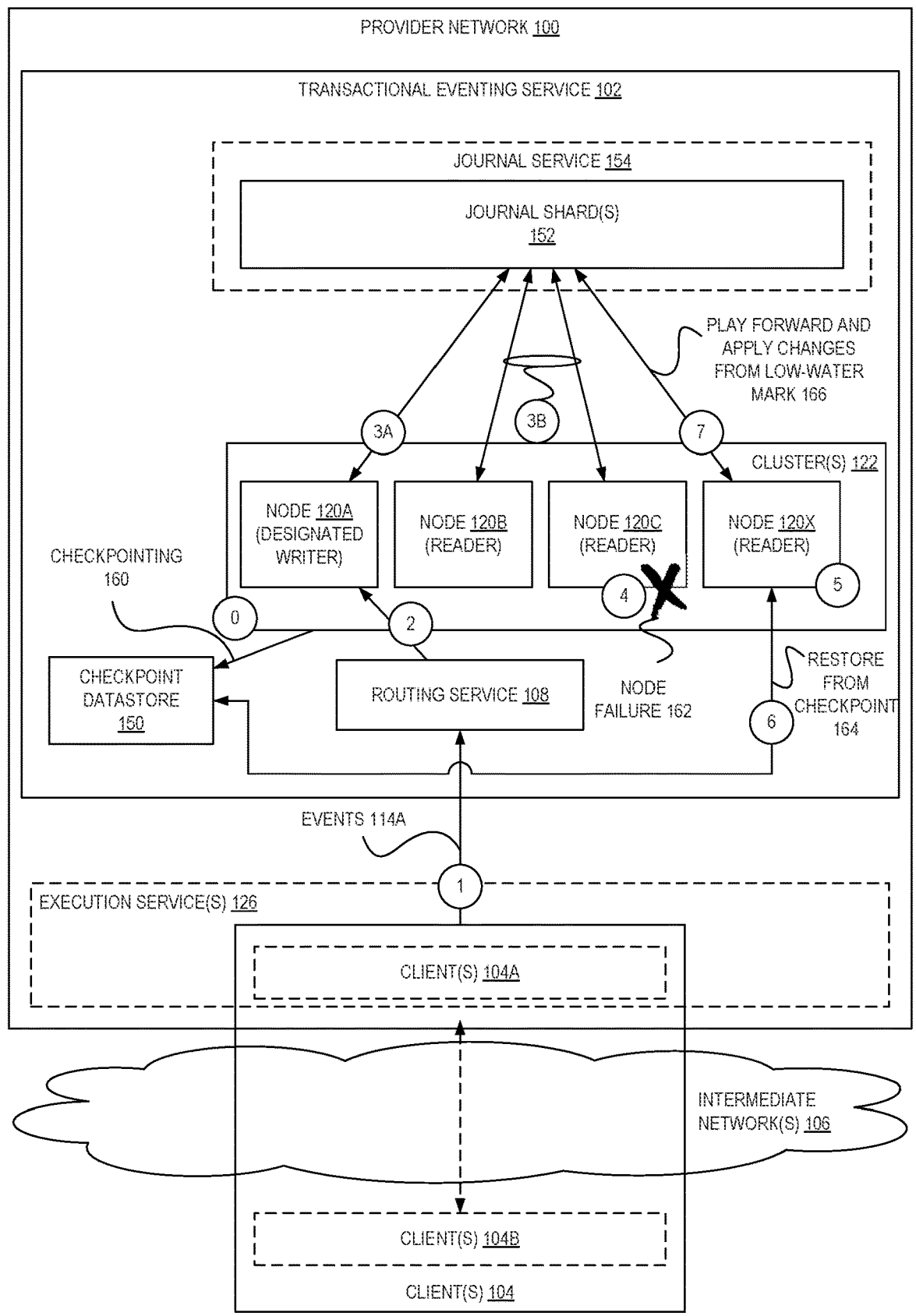
FIG. 1 is a diagram illustrating an environment for continuous lock-minimal checkpointing and recovery with a distributed log-based datastore according to some examples.

The present disclosure relates to methods, apparatus, systems, and non-transitory computer-readable storage media for continuous lock-minimal checkpointing and recovery with a distributed log-based datastore. According to some examples, a continuous, nearly lock-free, fault tolerant checkpoint-recovery process providing local replica state recovery allows for rapid and efficient cluster scaling and failure handling.

In some examples, an ordered, navigable collection is used to maintain a copy of state in the volatile memory of a node with sorted querying of durably persisted state data to derive a low-water mark value indicative of a point in a shard after which the recovery process starts. In contrast to other checkpointing techniques, such as fuzzy checkpointing, this approach provides a nearly lock-free, fault tolerant checkpoint process that minimizes disruption to the normal service activity and enables the recovery process to use the most updated low-water mark point, possibly including one from an in-progress checkpoint (if available) or low-water mark from a previously completed checkpoint. In some examples, the checkpoint process uses a single-table design to store both the state and checkpoint low-water mark value, which further simplifies the overall implementation while also minimizing the number of queries to the table during recovery. The low-water mark value for the recovery may be a minimum data sequence number (or "journal timestamp value") associated with an item that may need to be replayed after the completion of a checkpoint. While nothing prior to that point needs to be replayed, it is possible that another process may update the first record immediately after its lock is freed by the checkpoint process; in such cases, this update will be captured in a successive checkpoint.

In some examples, the replica state in a node's volatile memory (used for controlling the updating of entries into the backing datastore/shard) can be maintained in an ordered data structure using a "data sequence number" value as key. The nature of such a data structure allows for state to be flushed in an ascending order (e.g., according to the data sequence number values) while still allowing concurrent updates to the replica state. For example, reading from such data structures can provide access to a lowest-key entry (or highest-key entry) in a constant time (e.g., O(1) time). Accordingly, various types of sorted or semi-sorted data structures known to those of skill in the art can be used, for example, a data structure that can provide efficient access to a lowest or highest value, such as a min heap or max heap data structure, an ordered "concurrent" type data structure (e.g., ConcurrentSkipListMap), etc. In some examples, the insertion of new items can efficiently run in logarithmic time (e.g., O(Log n)).

In some examples, the checkpointing process can be further optimized by tracking records that have become "dirty" since the last checkpoint. The checkpoint process checks if the data sequence number on each item in the replica state in-memory store is less than the low-water mark value recorded during the last checkpoint, and if true, it skips flushing the item to the state store as it has not been dirtied since the last checkpoint. Thus, in some examples, each checkpoint invocation needs to write only the updated (or "dirty") records to the durable state store which minimizes the amount of input/output (I/O) operations performed involving this durable state store.

FIG. 1 is a diagram illustrating an environment for continuous lock-minimal checkpointing and recovery with a distributed log-based datastore according to some examples. In FIG. 1, a transactional eventing service 102, among possibly one or more other services such as execution services 126, are implemented using software, hardware, or a combination of both in a multi-tenant "cloud" service provider network 100. Each service may be implemented with a distributed manner, using multiple computing devices located in one or multiple data centers, autonomous zones (AZs), regions, or the like.

A provider network 100 (or, "cloud" provider network) provides users with the ability to use one or more of a variety of types of computing-related resources such as compute/ execution resources (e.g., executing virtual machine (VM)

instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc.

The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographic area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Typically, AZs within a region are positioned far enough away from one another so that a natural disaster (or other failure-inducing event) should not affect or take more than one AZ offline at the same time.

Users can connect to an AZ of the cloud provider network via a publicly accessible intermediate network 106 (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource, for example, by submitting code to be executed by the provider network (e.g., by an on-demand code execution service), which in turn uses one or more compute resources to execute the code—typically without the user having any control of or knowledge of the underlying compute instance(s) involved.

Accordingly, cloud provider networks 100 may implement one or more execution services 726, such as an on-demand code execution service, hardware virtualization service, container service, or the like.

An on-demand code execution service (referred to in various examples as a function compute service, functions service, cloud functions service, functions as a service, or serverless computing service) can enable users of a provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output (I/O) virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service can be a container orchestration and management service (referred to in various implementations as a container service, cloud container service, container engine, or container cloud service) that allows users of the cloud provider network to instantiate and manage containers. In some examples a container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

According to some examples, a transactional eventing service 102 is implemented to support transactional event processing using ACID (atomicity, consistency, isolation, and durability) semantics. The transactional eventing service 102, in some examples, is a log-based, append-only, durable event storage system with built-in support for event conditions that allow users to place conditions that must be met in order for events to be accepted into the datastore, and optimistic concurrency control to guarantee write consistency by preventing users from accidentally overwriting changes that were made by others. In some examples, the transactional eventing service 102 utilizes a transaction coordinator and a transaction buffer to support running ACID transactions across multiple streams spanning multiple shards with serializable isolation, and supports implementation of use cases needing strong data consistency and coordinated updates across multiple streams as part of a single logical operation (e.g., a "business" operation). Accordingly, such systems can enable transactional applications to be shifted to an event sourcing architecture. Event Sourcing is a pattern for storing data as events in an append-only log also referred as event streams.

In some examples, the transactional eventing service 102 stores and arranges data using "shards" and "streams." A shard represents a boundary for ordering guarantees and concurrency control. Within a shard, events are ordered and version locking can be enforced as needed. Storage for shards—or, journal shards 152—may be provided by a journal service 154 that provides a log-based, append-only storage system.

A stream is a uniquely identified sequence of events (e.g., events 114A) hosted on a shard. Multiple streams may be mapped to a single shard. A routing service 108 of the transactional eventing service 102 is responsible for assigning streams to a shards, and for routing write requests to a "designated writer" node (e.g., node 120A) for a particular shard. A designated writer is a role of a node 120 (e.g., an application hosted or run by a virtual machine, process, thread, etc.) typically in a cluster 122 of nodes 120A-120X that is responsible to write events to a shard. A designated writer node can be elected via a leader election protocol, and in some examples, there may only be one active designated writer for a shard at any point in time. The remaining nodes in the cluster 122 (e.g., nodes 120B-120X) may serve as "reader" nodes for that shard (e.g., used to read from the journal shard 152 but not update the shard), and may optionally serve as designated writers for other shards.

For many users, modern services such as a transactional eventing service 102 must be able to handle failure scenarios, scale up or down to accommodate changes in load, etc. To these ends, it may be necessary to add additional capacity, such as by adding additional "reader" nodes to a cluster 122 or replacing a node that is experiencing failures or similar issues.

To become fully operational, a new node needs to update its own internal state to be current. As described herein, a node (e.g., acting as a designated writer) may need to evaluate certain conditions to determine which new entries/ events are to be inserted into the underlying data storage (or shard). For example, a node may need to verify that a value within a new event is not larger than any corresponding value seen in earlier events, among many other types of admittance conditions. To this end, a node may keep track of a set of "state" tracking those values it needs to make admittance conditions, such as a "latest" or "maximum" seen value for particular values. Thus, this state may be viewed as metadata associated with the data of the shard(s) that is useful for nodes to be able to enforce application-defined conditions for admission control, such as journal identifiers, aggregate identifiers, data sequence number (e.g., journal timestamps), aggregate version numbers, or the like. With such state tracked in memory, the node can quickly determine whether an event can be "admitted" and sent on to storage, as opposed to needing to send queries to other systems (such as the storage system itself) to obtain the values necessary to make such a determination. In addition to designated writer nodes keeping this state, other reader nodes in the cluster also may keep track of this state to allow for these nodes to rapidly take over for the designated writer in the event of failures or other issues.

Typically, this internal state is generated by nodes processing all events in one or more streams, iteratively updating its state again and again, eventually arriving at the current state. However, this can be incredibly time and processing intensive, requiring a new node (being added to a cluster) to obtain all historic events (e.g., from the backend storage journal's shard(s)), analyze these events, and update its state, before being able to participate in a leader election process and potentially take the role of the designated writer. This can be problematic in a failure scenario where a production system is impaired and must be repaired as soon as possible, or when an increase in traffic demands that the system scale out to increase the amount of throughput of the system.

To this end, examples described herein provide a checkpointing-based recovery technique to allow nodes to quickly and efficiently update their local state to be current. Moreover, examples disclosed herein utilize one of various checkpointing schemes that can be implemented differently based on the needs of the particular user. For example, various compute-optimized and memory-optimized checkpointing techniques can beneficially be used to suit the needs of a particular use case. Further, as opposed to other techniques, examples described herein can implement checkpointing in a nearly lock-free, fault-tolerant manner that does not impact the primary operations of the involved nodes. Some examples thus use an ordered, navigable collection to maintain a copy of state in a node's volatile memory and utilize sorted querying according to data sequence numbers of the durably persisted state data to derive a low-water mark value useful in checkpointing and/or recovery, e.g., by indicating a point in a journal shard after which a recovery process is to start. Moreover, in examples described herein the checkpoint process minimizes disruption to the normal service activity and enables the recovery process to use the most updated low-water mark, including ones generated by an in-progress checkpoint.

Thus, as shown in FIG. 1, one or more (or all) of the nodes 120 of the cluster 122 may perform a checkpointing 160 process at circle (0), sending copies of its local replica state over time to a durable checkpoint datastore 150 (e.g., a relational database, NoSQL database, object store, or the like). In some examples, these copies of the state may also include logical sequence numbers (or similar identifiers) for each state that identify the corresponding change in the underlying journal shard 152.

In some examples, checkpointing is a mechanism allowing the system to recover from failures, where a checkpoint includes a copy of the local state of nodes and includes positions of streams (in a shard) indicating the corresponding last successful appends (to the shard). Thus, in case of a node failure or cluster scale out event, a newly-added node can load the state from the checkpoint and continue without needing to replay all events of the shard from the original position. Thus, a checkpoint's primary objective is to act as a lightweight and fast recovery mechanism ensuring a fault-tolerant processing framework that can recover from potential node failures and cluster scale out events. Checkpoints in some examples are automatic, periodic in nature, and owned, created, and dropped automatically and periodically by the event storage system, without user interaction, to ensure full and fast recovery in case of an unexpected node failure or a new node joining the cluster.

In some examples, the nodes 120 seek to keep their low-water marks close to the current data sequence number by periodically checkpointing their replica state from their volatile memory to a durable storage (e.g., checkpoint datastore 150). This can be implemented via use of a background periodic task that runs on some or all of the nodes 120. For example, all nodes 120 may perform checkpointing, or in another example, checkpointing is run only on the designated writer node 120A. The latter option reduces the overall overhead associated with checkpointing by keeping the number of tasks low—one task per shard, as opposed to N tasks per shard, where N is the total number of nodes. This option will also result in less data contention and thrashing while updating checkpoint state in the checkpoint datastore 150 by reducing the competing access to the same index at the same time by multiple checkpointing tasks. However, the single-checkpointing node option comes with a trade-off of lower availability compared to the option of running checkpoint tasks on all nodes. Thus, the particular configuration of which nodes perform checkpointing may be selected by the implementor based on their particular preferences.

Figure 2:
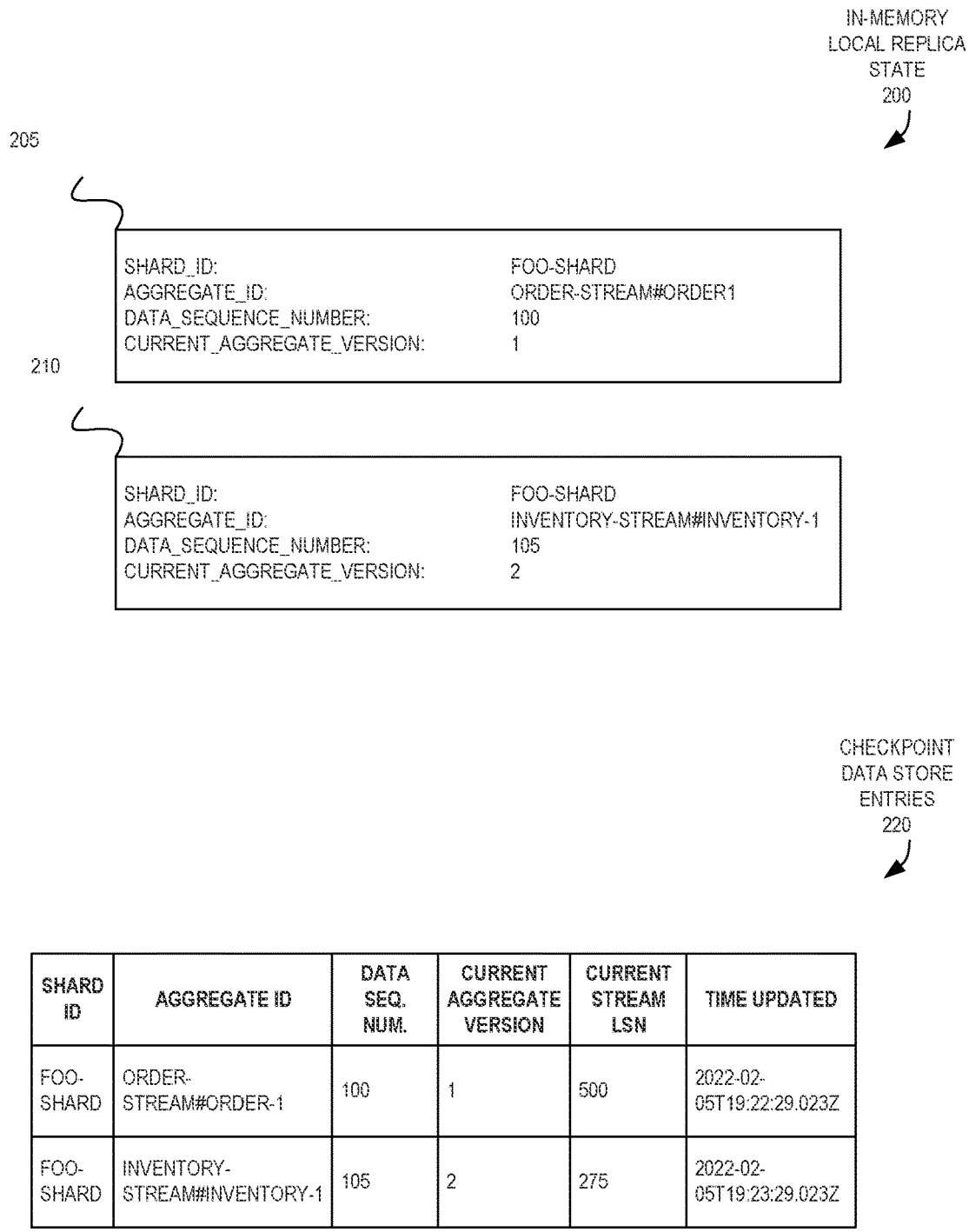
FIG. 2 is a diagram illustrating exemplary in-memory replica state and checkpoint datastore entries according to some examples.

For further understanding, FIG. 2 is a diagram illustrating exemplary in-memory local replica state 200 and checkpoint datastore entries 220 according to some examples. In this simple example, a node may have an in-memory local replica state 200 with the following two items—a first entry 205 pertaining to state for a first aggregate (here, having an aggregate identifier of "ORDER-STREAM #ORDER1") and a second entry 210 pertaining to state for a second aggregate (here, "INVENTORY-STREAM #INVENTORY1"). Each entry 205/210 includes state (or, metadata) identifying the associated shard, the associated data sequence number identifying a corresponding admitted journal entry, and a current aggregate version.

Upon checkpointing these entries, the relevant portion of the checkpoint datastore 150 (e.g., a database table) may include the following checkpoint datastore entries 220. This checkpoint state contains the necessary information from the replica state 200 so that nodes can connect to the associated shard and play forward all the changes that occurred during the time when the node was disconnected or otherwise not involved. When the node has applied these changes, the node has caught up to the latest data sequence in the shard and can continue receiving a stream of changes as before.

The Shard ID attribute may be a string serving as a unique identifier for the particular shard, and may be a primary partition key for this table. The Aggregate ID attribute can be a string providing a unique identifier for the involved aggregate (e.g., a collection of one or more involved objects), and may be a composite of a stream identifier and an aggregate identifier. The Aggregate ID may be configured as the primary sort key for the table and support individual aggregate queries needed for eviction and lazy loading.

The data sequence number (e.g., a journal-time-nano or journal-timestamp-nano value) attribute can be a numeric value (e.g., a long datatype) identifying a corresponding entry into the journal that is associated with this particular state item. When a journal (having one or more shards) is created, a logical journal clock is initialized with a value of zero. This clock advances at roughly the pace of wall clock time and never goes backwards. When a data-record is appended to the journal, the value of this clock is sampled and stamped into the data sequence number field of the data record. In some examples, an additional guarantee that the journal service provides is that no two journal records will ever have the same data sequence number values, and thus, these values can uniquely identify a particular data-record (or "event") inserted into the journal. Accordingly, a data sequence number can be a monotonically increasing number. With reference to this table, the data sequence number value can be used as an attach point when a new follower node connects to shard and needs to play forward all the records that have been added after that point in order to "catch up" to the latest and thus become current. This value is often called the low-water mark. In some examples, a local secondary index (LSI) can be added to the table using the data sequence number as a sort key, which allows for efficient querying of the state table sorted by data sequence number.

The Current Aggregate Version attribute can be a numeric value that indicates a current version of the associated aggregate, whereas the Current Stream LSN can be a numeric value indicating the current log sequence number (LSN) of the log for the stream. Finally, the time updated value can be a "date" or "datetime" type value indicating a wall-clock time with millisecond precision indicating when the checkpoint state was last updated; in some examples, an LSI may be added using the Time Updated attribute as a sort key, allowing an efficient query of the state table sorted by Time Updated.

Figure 3:
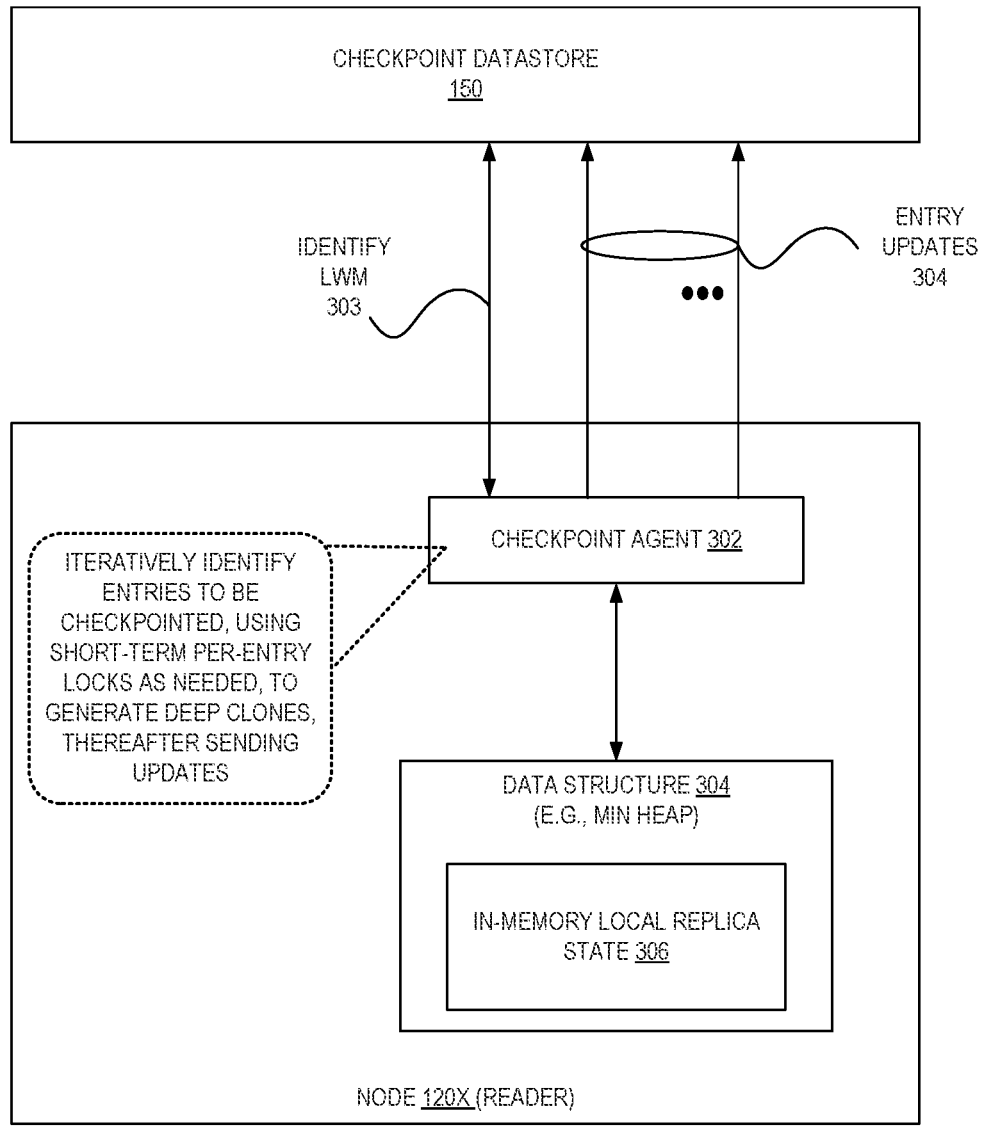
FIG. 3 is a diagram illustrating a memory-optimized checkpointing configuration for continuous lock-minimal checkpointing and recovery with a distributed log-based datastore according to some examples.

As indicated elsewhere, various checkpointing techniques can be implemented. For example, FIG. 3 is a diagram illustrating a memory-optimized checkpointing configuration for continuous lock-minimal checkpointing and recovery with a distributed log-based datastore according to some examples. This configuration is referred to as being memory-optimized in that it places a comparatively small memory burden at the trade-off of a slightly larger compute burden, though this may be preferred in constrained memory environments and/or where significant processing capacity is available.

As shown, a checkpoint agent 302 executed by the node 120X can manage the checkpoint process and begin by querying the latest low-water mark from the checkpoint datastore 150 at 303. As one example, this can be performed by querying a state table for given shard using the LSI on the data sequence number field, with ScanIndexForward set as false, and picking the first returned item from the result set. Because all rows for a shard are stored in sorted fashion according to the data sequence number value, the first entry in descending order will be the one with a data sequence number that can be used as most updated low-water mark.

The checkpoint agent 302 can then iteratively identify entries (of the in-memory local replica state 306, as stored in a data structure 304 such as a min heap) to be checkpointed, and for those identified entries, using a short-term lock on the entry to generate a deep clone, and upon releasing the lock, use the deep clone to generate an update to be sent to the checkpoint datastore 150.

As one example, the data structure 304 may be a min heap, and the process may include having the checkpoint agent 302 first iterate through the min heap to identify the last item (in case the items change during the course of this checkpointing).

The checkpoint agent 302 may then find the minimum item (e.g., via a "peek") from the replica state min heap, which beneficially takes constant time to run (e.g., is O(1)).

If the data sequence number value of this entry matches with a previously processed item, it is skipped as it has not been dirtied since the last checkpoint, and the checkpoint agent 302 gets the next minimum item from the heap (in ascending order of data sequence number). This operation takes O(K*log K) time, where k is the Kth least element in the min heap.

With an entry, if the data sequence number is less than the identified low-water mark value, then the entry is skipped, as it has not been dirtied since the last checkpoint occurred.

Otherwise, the checkpoint agent 302 can take exclusive lock on the entry. The lock is acquired for a short duration to protect the entry from changing before its flushed to the state store durably.

The checkpoint agent 302 can then deep clone the entry, quickly release the lock, and continue to build a checkpoint state object for the entry. Each checkpoint state object is amended to include the associated data sequence number value, i.e., the low-water mark value. By including this low-water mark with each state record, the system avoids a dual-write problem that can lead to inconsistent state if the checkpoint process fails halfway through after flushing state info into the datastore but before committing the low-water mark. The checkpoint state object, or a reformatted version thereof, can be used to generate a request to insert (or upsert) a state entry into the checkpoint datastore.

This process can continue until all entries are processed (e.g., by comparing a current entry to the earlier-identified "last" entry), and as indicated, only involves use of the existing data structure 304 (used for general admittance control operations by the node 120X) and brief deep copies of individual entries—thus, it is light in terms of needed memory.

This process can be further optimized via use of other types of data structures. In some examples, to improve the runtime of this memory-optimized variation, the min heap is replaced with a fully ordered, concurrent, navigable map data structure (e.g., ConcurrentSkipListMap from the Java Collection Framework). Such a map can be sorted according to the natural ordering of the data sequence numbers and provide an average log(n) time cost for the containsKey, get, put, and remove operations (and their variants). Further, the insertion, removal, update, and access operations safely execute concurrently by multiple threads.

Example pseudo-code for a memory-optimized checkpoint process, using a Concurrent Navigable Map data structure to house the local replica state, is provided below:

```
previousLWM = db.getPreviousLWM( )
lastItemInReplicaState =
replicaStateConcurrentNavigableMap.iterator( ).last( );
    minItem = None
    while (True):
        item = replicaStateConcurrentNavigableMap.firstKey( )
        # if the item is already processed, get the next min item
        if minItem == item:
            item = replicaStateMinHeap.higherEntry(minItem) // O(log n)
            minItem = item
        # check if the item is dirtied since last checkpoint
        if item.DataSequenceNumber <= previousLWM:
            # skip flushing to checkpoint state store
            continue
        else:
            # flush item into checkpoint state store
            lock(item)
            checkpointStateItem = buildCheckpointState(item) # deep clone
            releaseLock(item)
            flushStateItemToDB(checkpointStateItem)
    # we have made one pass through the replica state and exiting
    checkpoint
    if item == lastItemInReplicaState:
        break
```

Figure 4:
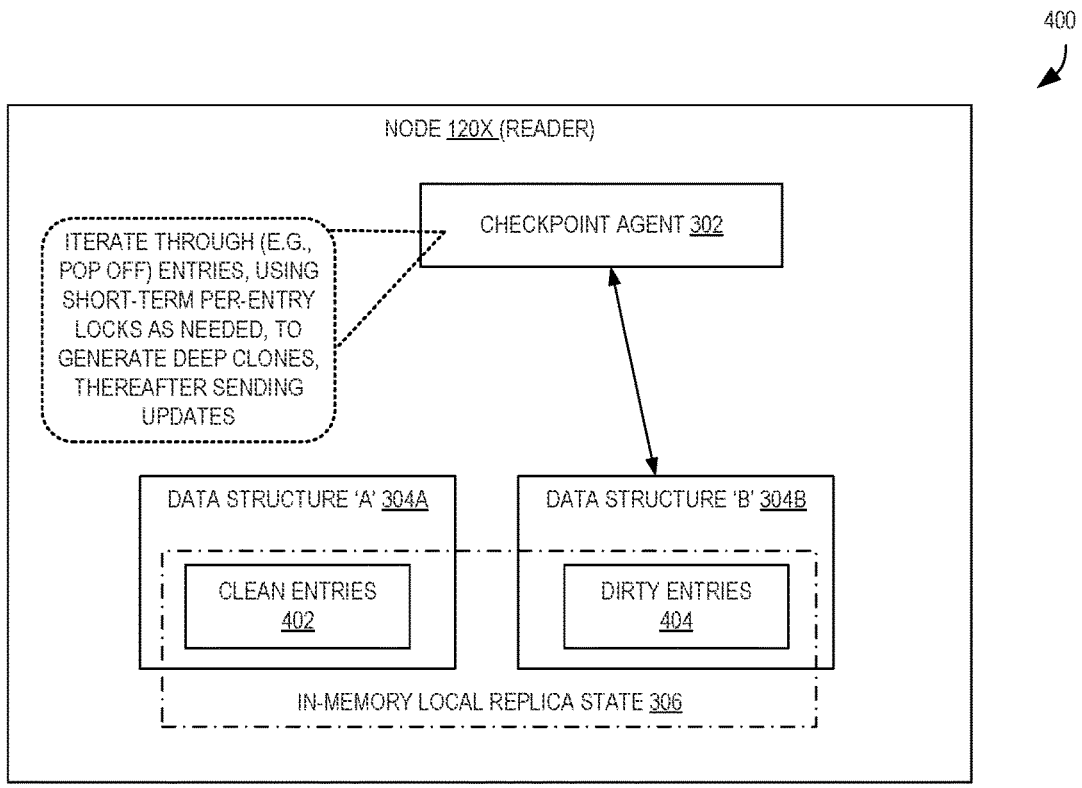
FIG. 4 is a diagram illustrating two compute-optimized checkpointing configurations for continuous lock-minimal checkpointing and recovery with a distributed log-based datastore according to some examples.
Figure 4:
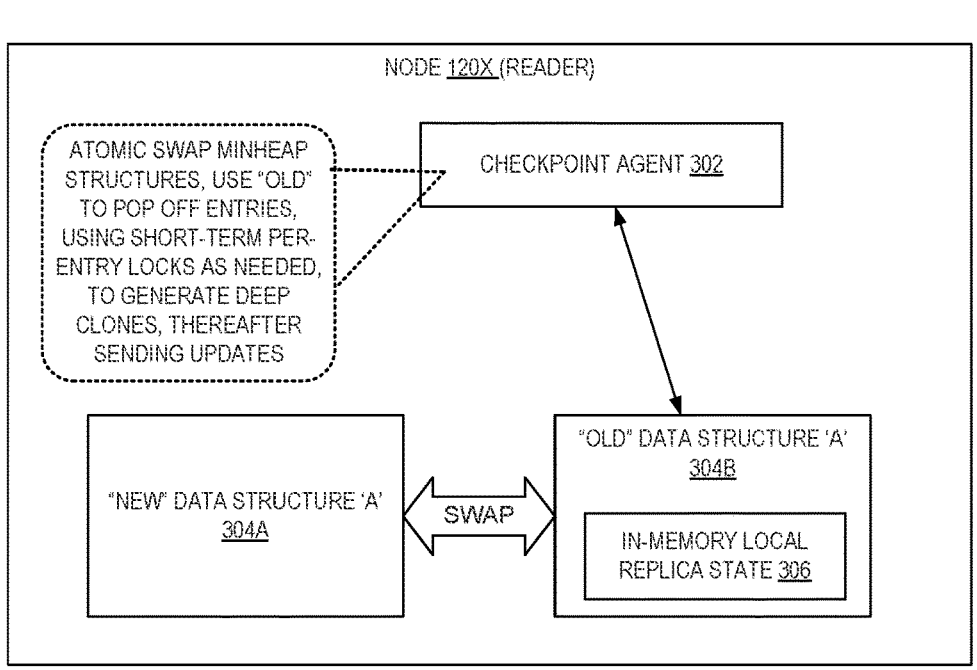

Additionally, compute-optimized checkpoint processes can be performed that are comparatively lighter in compute load at the expense of memory utilization, which can be beneficial in processing constrained environments, when "regular" processing of the node cannot be impacted, when memory is plentiful, or the like. To this end, FIG. 4 is a diagram illustrating two compute-optimized checkpointing configurations for continuous lock-minimal checkpointing and recovery with a distributed log-based datastore according to some examples.

As shown at 400, a compute-optimized checkpoint process can be implemented that utilizes two separate data structures to store the in-memory local replica state 306—data structure 'A' 304A to store "clean" (or, non-dirty) entries 402 that have already been checkpointed, and data structure 13' 304B to store "dirty" entries 404 that have not.

As shown, a checkpoint agent 302 executed by the node 120X can manage the checkpoint process and begin by querying the latest low-water mark from the checkpoint datastore 150. As one example, this can be performed by querying a state table for given shard using the LSI on the data sequence number field, with ScanIndexForward set as false, and picking the first returned item from the result set. Because all rows for a shard are stored in sorted fashion according to the data sequence numbervalue, the first entry in descending order will be the one with a data sequence number that can be used as most updated low-water mark.

As one example, the "dirty" data structure 304B may be a min heap (or another type of ordered or semi-ordered data structure), and the process may include having the checkpoint agent 302 pop the minimum item from the dirty item min heap, an operation that takes logarithmic time to run (e.g., O(Log n)).

If the data sequence number value of this entry matches with a previously processed item, it is skipped as it has not been dirtied since the last checkpoint, and the checkpoint agent 302 pops the next entry. The checkpoint agent 302 can take exclusive lock on the entry. The lock is acquired for a short duration to protect the entry from changing before it is flushed to the state store durably.

The checkpoint agent 302 can then deep clone the entry, quickly release the lock, and build a checkpoint state object for the entry. Each checkpoint state object is amended to include the associated data sequence number value, i.e., the low-water mark value. By including this low-water mark with each state record, the system avoids a dual-write problem that can lead to inconsistent state if the checkpoint process fails halfway through after flushing state info into the datastore but before committing the low-water mark.

This process can continue until all entries are processed, and as indicated, involves use of an additional data structure 304B but is comparatively very lightweight computationally.

Example pseudo-code for such a compute-optimized checkpoint process, using min heap data structures to store local state, is provided below:

```
previousLWM = db.getPreviousLWM( )
lastItemInDirtyMinHeap = dirtyItemMinHeap.iterator( ).last( );
while (True):
    item = dirtyItemMinHeap.extractMin( ) # a.k.a pop
    # check if the item is dirtied since last checkpoint
    if item.DataSequenceNumber <= previousLWM:
        # skip flushing to checkpoint state store
        continue
    else:
        # flush item into checkpoint state store
        lock(item)
        checkpointStateItem = buildCheckpointState(item) # deep clone
        releaseLock(item)
        flushStateItemToDB(checkpointStateItem)
    # we have made one pass through the replica state and exiting
    checkpoint
    if item == lastItemInDirtyMinHeap:
        break
```

Further, another checkpoint variation 450 is shown that is also compute-optimized and works through use of an atomic-swap type operation. In this example, the "regular" data structure that tracks state can be atomically swapped at the beginning of each checkpointing, e.g., with an empty data structure (e.g., "new" data structure 'A' 304A), and thus the swapped-out version ("old" data structure 'A' 304B) can be operated upon directly. This beneficially does not need to utilize locking (e.g., aside from during the atomic swap itself) as the checkpoint agent 302 directly "owns" the swapped-out data structure.

As indicated, there are space/time trade-offs involved between these various checkpoint variations. For example, creating a separate min heap for dirty items can double the memory footprint for a node in a worst case scenario when all items in the replica state have been dirtied, and bump up the item update time from O(1) to O(log N), as for each item update in the replica state, there will be a corresponding insert in the dirty items min heap. In contrast, using a single min heap to store the entire replica state comes at a cost of increased checkpoint time complexity which in worst case could go up to O(pow(N,2)). However, the quadratic runtime performance is mitigated to certain extent as the above algorithms provide continuous checkpointing that allow the recovery processes to run concurrently with an on-going checkpoint and use the most updated low-water mark including one from an in-progress checkpoint, if available. Further, the runtime for a memory-optimized min heap variation can be reduced from O(pow(N,2)) to O(N(log N)) by replacing the min heap with a fully ordered, concurrent, navigable map data structure.

Accordingly, in some examples, the transactional eventing service 102 may allow its users to configure which type of checkpointing to utilize, e.g., a user may use a user interface (e.g., a console web application, an API, etc.) to identify which type of checkpointing to use, and/or provide logic that can be evaluated to determine which type of checkpointing to use (e.g., if memory utilization over the past period of time is greater than a provided threshold then use a memory-optimized technique, otherwise use a compute-optimized technique), etc.

Returning to FIG. 1, in the course of operation, events 114A originated by one or more clients 104A-104B (executed outside the provider network 100, or perhaps by an execution service 126 within the provider network 100) are sent to the transactional eventing service 102 at circle (1) to be inserted into the journal (e.g., into a corresponding journal shard 152). The events 114 are received at a routing service 108 and sent to the designated writer node 120A that "owns" the writing of events belonging to the particular shard associated with the event at circle (2).

Using its local state, the node 120A can make an admission control decision (e.g., by evaluating one or more conditions or rules based on values of the event in comparison to those in the associated state). Assuming the event is allowed to be inserted, at circle (3A) the node 120A sends insertion messages to the journal shards 152 to insert the event and also updates its own local state.

As shown by circles (3B) and (3C), the reader nodes 120B-120C in the cluster 122 "follow along" by reading a stream of updates to the shard, and similarly update their own local state.

At some point, as reflected by circle (4), some failure may impact a node—here, node 120C. This failure may be a hardware failure (e.g., a memory or processor failure), a software failure (e.g., an application or virtual machine crash/fault), a network failure (e.g., a disconnection from the network), a utility failure (e.g., power loss), etc., and may be a fatal failure, temporary failure, etc. Detecting this issue, the transactional eventing service 102 can determine to add an additional node (here, node 120X) into the cluster 122 to take the place of the failed node 120C at circle (5). This node can perform a fast recovery technique disclosed herein, based on use of the checkpointed data described herein, to quickly update its state and begin useful operation. For example, at circle (6) the node 120X can begin by performing a partial restore 164 by interacting with the checkpoint datastore 150, and finish the restoration by replaying changes 166 from a low-water mark/attach point of the journal shard 152 (identified via the checkpoint datastore 150) at circle (7) to update its local replica state completely.

Figure 5:
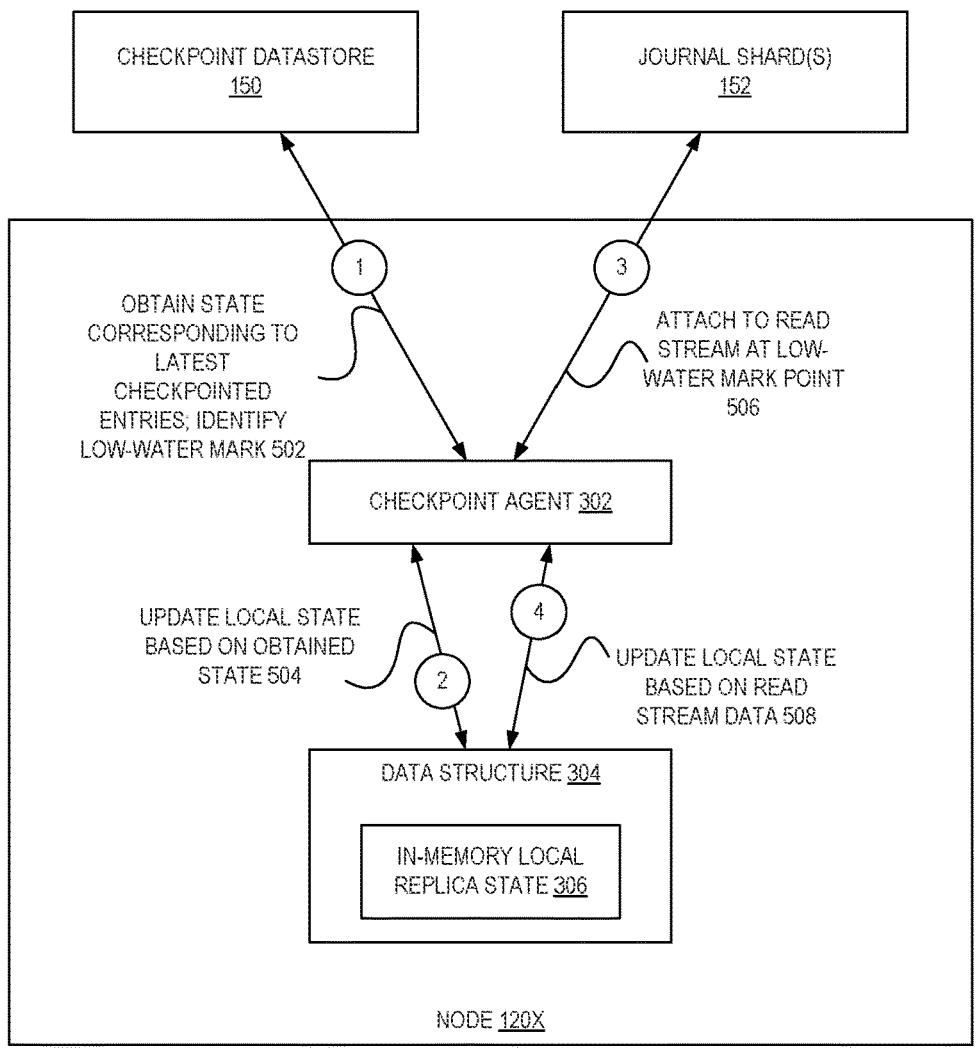
FIG. 5 is a diagram illustrating an exemplary recovery process with a distributed log-based datastore according to some examples.

In further detail, FIG. 5 is a diagram illustrating an exemplary recovery process 500 with a distributed log-based datastore according to some examples. Using the checkpointed data from a checkpoint datastore 150 as described herein, a checkpoint agent 302 can perform a recovery process to quickly and efficiently update its in-memory local replica state 306.

In some examples, when a new node is added to a cluster, the checkpoint agent 302 of the new node 120X at circle (1) reads the state data from the latest checkpoint (in the checkpoint datastore 150), e.g., sorted by the data sequence number attribute in descending order. This can be performed by querying the state table for given shard using the LSI on data sequence number, with ScanIndexForward set as false, and picking the first returned item from the result set. Because all rows for a shard are stored in sorted fashion by the data sequence numbervalue, the first entry in descending order will be the one with a data sequence number value that can be used as most updated low-water mark during recovery. This step covers the edge case where the recovery process can be forced to go all the way back in the journal shard to find a low-water mark should an aggregate not received an update for a long time.

With this data, the checkpoint agent 302 can generate the requisite data structure(s) 304 and update 504 the state data as in-memory local replica state 306 in the volatile memory at circle (2)

At circle (3), the checkpoint agent 302 can use the highest data sequence number value associated with the most recently updated aggregate from the checkpoint state datastore 150 as an attach point (or low-water mark) to the journal shard while opening a stream to it. For example, this may include use of a reader stream type request (sent by the node 120X) that can include an identifier of an attachment point, e.g., a journal timestamp corresponding to the data sequence number value, which defines the exact point in the journal timeline that the stream will attach at. As a result, all stream records having a data sequence number value greater than that of the attach point will be sent to the stream.

The checkpoint agent 302 can thus start reading from the stream (at the attach point) and apply changes to replica state 306 at circle (4).

Thereafter, the new node may begin operation as a follower/reader and keep its state up to date in order to be ready should it become the leader/designated writer.

Accordingly, examples disclosed herein can be continuous as recovery processes can use a low-water mark value—even from an ongoing checkpoint—as an attachment point. Examples are also fault tolerant, as if a checkpoint process fails halfway through, the state and low-water mark it committed to the state store will still remain usable by the recovery process rather than using the information from last successfully run checkpoint. This makes checkpoint and recovery process more resilient to failures.

Examples are also nearly lock-free, as the checkpoint process doesn't need to lock the entire replica state of node during its run and instead may only acquire locks on one item at a time to deep clone the items before flushing them to state store. This allows user operations to run concurrently with the checkpoint process. Moreover, different variations can be used to support compute or memory intensive workloads, and users can choose memory or compute optimized variations of the checkpoint process based on the nature of workloads they have.

Figure 6:
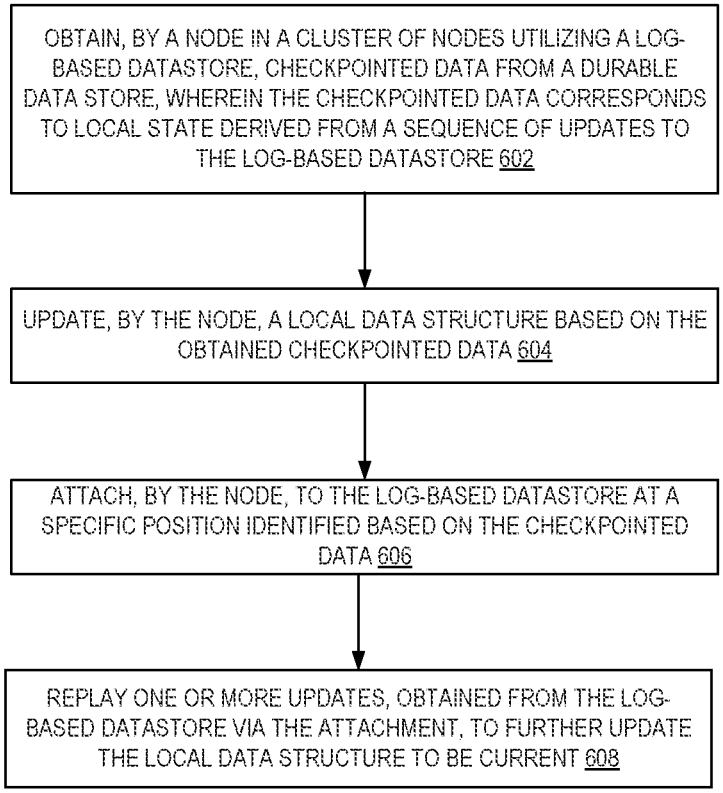
FIG. 6 is a flow diagram illustrating operations of a method for continuous lock-minimal checkpointing and recovery with a distributed log-based datastore according to some examples.

FIG. 6 is a flow diagram illustrating operations 600 of a method for continuous lock-minimal checkpointing and recovery with a distributed log-based datastore according to some examples. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by a node 'A20 (e.g., or more generally, can be performed by a transactional eventing service 102) of the other figures.

The operations 600 include, at block 602, obtaining, by a node in a cluster of nodes utilizing a log-based datastore, checkpointed data from a durable datastore, wherein the checkpointed data corresponds to local state derived from a sequence of updates to the log-based datastore. The operations 600 further include, at block 604, updating, by the node, a local data structure based on the obtained checkpointed data. The operations 600 further include, at block 606, attaching, by the node, to the log-based datastore at a specific position identified based on the checkpointed data, and at block 608, replaying one or more updates, obtained from the log-based datastore via the attachment, to further update the local data structure to be current.

In some examples, the operations 600 further include adding the node to the cluster, prior to the obtaining of the checkpointed data, as part of a horizontal scaling of the cluster or based on determining that another node of the cluster has experienced a failure or performance issue. In some examples, the operations 600 further include participating, by the node, in a leader election process to determine which node of the cluster is to serve as a designated writer node, wherein the other nodes of the cluster are to act as follower nodes.

In some examples, the operations 600 further include identifying, by the node via use of the durable datastore, an identifier of a most recently checkpointed entry corresponding to the local state; and executing, by the node, a checkpointing process based at least in part on use of the identifier of the most recently checkpointed entry, the checkpointing process comprising: iterating through entries in the local data structure to identify one or more entries that have been updated after the most recently checkpointed entry. In some examples, for each entry identified during the iterating, the node is to lock the entry, create a deep copy of the entry while the entry is locked, unlock the entry, and transmit an update to the durable datastore generated based on use of the copy of the entry. In some examples, the local data structure comprises a min heap data structure or a concurrent data structure. In some examples, the checkpointing process is non-blocking and thus occurs while the local data structure remains actively used and updated. In some examples, the local data structure provides constant time access (e.g., O(1)) to that entry having a minimum key value.

In some examples, the local data structure comprises a first data structure that stores dirty local state that has not yet been checkpointed and further comprises a second data structure that stores local state that has been checkpointed, and wherein the method further comprises: executing, by the node, a checkpointing process via use of the first data structure.

In some examples, the operations 600 further include executing, by the node, a checkpointing process, comprising: performing an atomic swap to cause a second local data structure to be used for controlling updates to the log-based datastore in place of the initial local data structure; and utilizing the initial local data structure to generate updates to be transmitted to the durable datastore.

In some examples, the operations 600 further include receiving a user-provided input indicating a type of checkpointing to be performed by the cluster, wherein the type is one of compute optimized or memory optimized; and configuring at least the node of the cluster to perform a checkpointing process based at least in part on the user-provided input.

In some examples, the operations 600 further include identifying, from the checkpointed data, a data sequence number associated with a change made in the log-based datastore. In some examples, the cluster of nodes are implemented by a transactional eventing service of a multi-tenant cloud provider network.

As indicated herein, these techniques may be used in a variety of settings, such as with a log-based datastore. In some examples, the log-based datastore is a distributed system that supports transactions. Turning more specifically to the transactional eventing service 102, safety guarantees provided by transactions are often described by the well-known acronym ACID, which stands for Atomicity, Consistency, Isolation, and Durability. The term was coined in an effort to establish precise terminology for fault-tolerance mechanisms in databases.

ACID atomicity describes what happens if a client 104 wants to make several writes to a datastore, but a fault occurs after some of the writes have been processed—for example, a process crashes, a network connection is interrupted, a disk becomes full, or some integrity constraint is violated. If the writes are grouped together into an atomic transaction, and the transaction cannot be completed (or "committed") due to a fault, the transaction is aborted and any writes it has made so far in that transaction are discarded.

Isolation in the sense of ACID means that concurrently executing transactions are isolated from each other, and thus cannot "step on each other's toes." The classic textbook definition formalizes isolation as serializability, which means that each transaction can pretend that it is the only transaction running, and when transactions have committed, the result is the same as if they had run serially (one after another) even though they may have run concurrently. The transaction isolation level controls the amount of information that is visible to observers during a transaction, and with serializable isolation, it appears that transactions run serially, isolated from each other, and therefore helps achieve a consistent view of data across transactions.

In some examples, as described herein, the transactional eventing service 102 utilizes optimistic concurrency control (OCC) as one part of providing multi-stream transactionality. OCC is a concurrency control technique applied to transactional systems, which assumes that multiple transactions can frequently complete without interfering with each other. While running, individual transactions can use data resources without acquiring locks on those resources. Before committing, each transaction verifies that no other transaction has modified the data it has read. If the check reveals conflicting modifications, the committing transaction rolls back and can be restarted. However, it is often the case that no other transaction has modified the data it has read, so the transactions can be performed in these cases very quickly with minimal overhead.

As indicated herein, a core aspect of streams, which are logical groupings of events, is that they provide a unit of transactionality. For example, a stream could pertain to events for a particular application, or customer, or function of an application, and it is relatively straightforward to provide transactionality for these streams as they may often be mapped to a single shard and various accesses to its data can be quickly and easily monitored. However, it may be the case that applications need to perform transactions involving multiple streams, which may be mapped to multiple shards and may be distributed across potentially a number of different processing nodes. In these cases, implementing ACID transactionality becomes much more difficult and resource intensive, for example, using complex two-phase commit (2PC) procedures.

In examples described herein, the transactional eventing service 102 can guarantee to applications that events produced to one or more streams spanning over one or more shards (and possibly in multiple shards that are distributed in nature)—either grouped together or produced as several individual events within a transaction—will persist or fail as one single unit. Thus, in some examples, event producers can be assured the ability to produce several individual events, within a transaction, across multiple streams which can support saga without requiring producer-compensating actions.

In current distributed systems, users with transactional applications needing ACID transactionality may need to constrain such writes to streams on a single shard, which limits applications to need to map all streams that are required to participate in a transactional write to a single shard. However, if applications are required to distribute those streams across multiple shards for any of a variety of reasons—such as achieving higher throughput than what can be supported by a single shard, isolating streams by data classification and compliance etc.—these users typically cannot run the transactional workloads that they need to atomically write to those streams. Consider an e-commerce application having two different streams for (1) inventory and (2) orders, which are spread over two different shards. To correctly process a customer order, the application would need to run a workflow that decrements the inventory and creates the order, which requires writing events atomically across two different shards. Another use case for atomic writes is moving money from one account to another, where one account is on one shard and the other account on another shard. To make this transaction, the application would need to write to two different shards atomically within a transaction; however, this is not supported in existing systems due to the need to implement complex 2PC procedures in such distributed systems, which would not be suitably performant.

In examples described herein, the transactional eventing service 102 supports serializable isolation between transactions across one or more stream spanning over one or multiple shards, ensuring that if a write collision is detected among several concurrent transactions, only one of them is allowed to commit.

Further, if an "aggregate" state is modified outside of a transaction while the transaction is in progress, the transaction will be aborted. An aggregate is a well-known pattern in Domain-Driven Design (DDD), where an aggregate is a cluster of domain objects that can be treated as a single unit. An example may be an order and its line-items; these may be separate objects, but it is often useful to treat the order (together with its line items) as a single aggregate. Thus, if there are more customers attempting to buy items than there is inventory, the ideal final outcome is that all of the inventory will be sold, and no more. In contrast, if multiple customers attempt to purchase an item at the same time without such serializable isolation provided by the examples disclosed herein, two parallel transactions may see that available inventory is "1" and both process their orders, which results in the negative outcome of an overselling of the inventory.

Serializable isolation is the strongest isolation level that guarantees that transactions have the same effect as if they ran serially (i.e., one at a time without any concurrency). Serializable isolation protects against all concurrency side effects caused by intermingled read and write of events across two or more concurrent transactions including dirty reads, dirty writes, non-repeatable reads, write skew, and phantoms.

With such support for atomicity and isolation properties as described herein, event producers can send a batch of events to one or more streams spanning over one or more shards in an all-or-nothing manner that is isolated with other concurrent transactions. This guarantees that all events in a batch are eventually visible to any observer (including other transactions) of those streams, or that none are ever visible to any observer. Users can thus build applications that rely on atomicity and isolation properties of transactions to achieve consistency by enforcing application's notion of invariants—for example, in an accounting system, credits and debits across all accounts must always be balanced.

One classic example of where atomicity is required is in a banking payments system, where a transfer of funds from one account to another account must happen atomically, even if the two accounts are stored on different shards. Assume account holder A wants to send money from an account A to an account B; thus, the operation of both subtracting money from account A, and adding it to the account B, must be treated as one indivisible call, and if the second operation is rejected, the first calculation must be rolled back too. Thus, it is always all-or-nothing—either both updates occur, or none occur. Thus, in some examples, an account service (e.g., client) receives a request to transfer money from account A to B, and in processing the request it bundles up two events—"MoneyAdded" and "MoneySubtracted" into a transaction and asks the transactional eventing service 102 to write them atomically across two different streams (e.g., AccountA and AccountB streams), even if the two accounts are stored on different shards.

In some examples, the transactional eventing service 102 provides transactional support that, at a high level, utilizes a combination of optimistic and pessimistic concurrency mechanisms to manage transactions. During a first stage of a transaction, examples apply pessimistic concurrency control to lock-in events in a transaction from being observed outside the client that started the transaction until they are committed or aborted. In the second and final stage of a transaction, examples apply optimistic concurrency control to commit events in a transaction only if there are no write collisions and event condition violations detected on all shards involved in a transaction.

Figure 7:
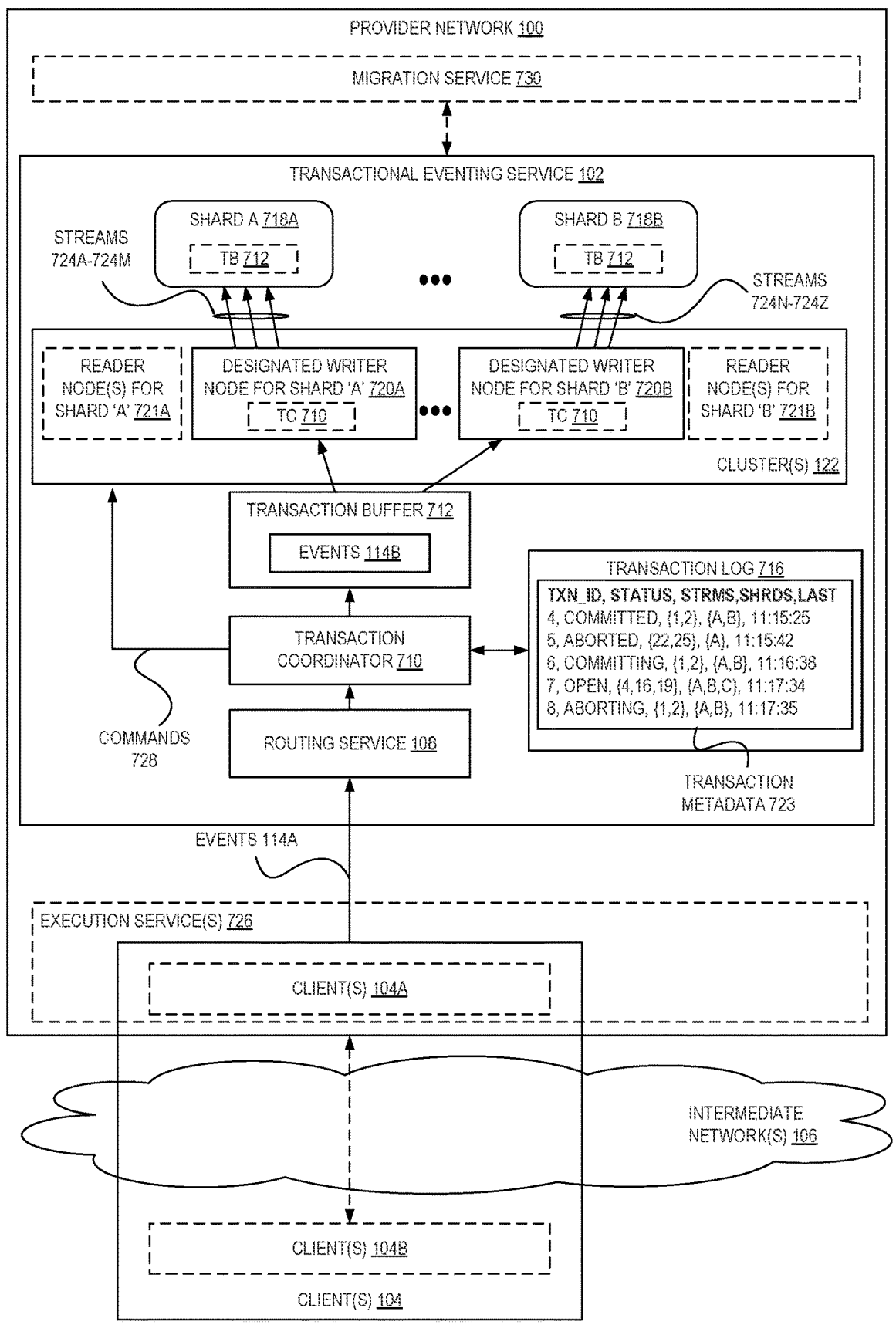
FIG. 7 is a diagram illustrating an environment for multi-stream transactional event processing with a distributed log-based append-only datastore according to some examples.

FIG. 7 is a diagram illustrating an environment for multi-stream transactional event processing with a distributed log-based append-only datastore according to some examples. As shown in FIG. 7, the transactional eventing service 102 includes a routing service 108, a transaction coordinator 710, a transaction buffer 712, and one or more clusters 122 of nodes 720-721 for reading and/or writing to shards 718A-718B. The nodes 720-721 may, in some examples, take on different roles such as being elected/configured as a designated writer for a shard (e.g., node 720A), or generally for reading (e.g., node 721A), though a "reader" type node can become a designated writer, for example, in the event of a failure of the "old" designated writer, e.g., via some type of leader election scheme known to those of skill in the art. In some examples, the one or more clusters 122 are distributed in that they are implemented on different virtual machines and/or computing devices, potentially in different physical locations (e.g., racks, rooms, buildings, cities, data centers, or the like). As one use case, the transactional eventing service 102 may be utilized by a migration service 730, e.g., to migrate applications (e.g., from a user's on-premise environment, from a separate cloud provider network, or from within the cloud provider network) into the provider network 100, which may include changing a type of storage system used by an application, e.g., from a relational database to a log-based append-only type of system such as one provided by a transactional eventing service 102.

In some examples, a "front end" routing service 108 includes one or more nodes that receives events/requests (e.g., to read from and/or write to streams 724A-724Z), and "routes" them to an appropriate location for processing, such as by selecting a transaction coordinator 710 and sending the requests to it.

The transaction coordinator 710, which is somewhat similar to those used in 2PC systems, can maintain the lifecycle of a transaction and prevent a transaction from having an incorrect status. The transaction coordinator 710 manages transactions of events sent by producers (e.g., an internal client 104A, implemented in an execution service 726 of the provider network 100, and/or an external client 104B deployed in a separate network or location) and commit or abort the operations as a whole. The transaction coordinator 710 can be implemented as a distinct service (e.g., as a standalone microservice, component, virtual machine, or the like), or can be implemented as part of (e.g., as a set of one or more software modules) one of the designated writer nodes (e.g., designated writer node 720A), as the designated writer controls event admission.

The transaction coordinator 710, in some examples, maintains metadata identifying the shard and/or streams that are part of (or "participate in") a transaction. When a transaction is committed, the transaction coordinator 710 interacts with the relevant shards and their designated writers to complete the transaction.

In some examples, the transaction coordinator 710 persists this transaction metadata 723 in a persistent storage (e.g., a transaction log 716) for durability and recovery. The transaction log 716 stores the transaction status metadata, rather than the actual event data in the transaction, as the actual events may be stored in the actual streams. If and when the transaction coordinator 710 crashes, it can restore the transaction metadata from the transaction log 716. In this example, the transaction metadata 723 includes, for a transaction, a transaction identifier/ID (shown as TXN_ID), transaction status, set of involved streams, set of involved shards, a last update time, etc., though in various examples more, fewer, and/or different values can be tracked. The transaction log 716, in various examples, can be implemented using a key-value store, a lightweight relational database, plain-text files, or other data structure that can be updated and persisted.

In some examples, each transaction is assigned a unique transaction ID, e.g., by the transaction coordinator 710. If a transaction crash occurs (e.g., due to exceeding a timeout limit) or a new transaction coordinator 710 is elected, the transaction can thus be located using the unique transaction ID durably persisted in the transaction log 716.

In some examples, events 114B produced within a transaction are stored in a transaction buffer (TB) 712. The transaction buffer 712 may store events 114B of all ongoing and optionally all aborted transactions. The events in the transaction buffer 712 may be durably stored so that they are not lost in the event of a transaction coordinator 710 crash or when a new transaction coordinator 710 is elected. When a transaction is aborted, the messages in the transaction buffer 712 may be discarded. The events 114B in the transaction buffer 712 will not be visible to any observers except the observer (e.g., client 104) that started the transaction until the transactions are committed. Further details are provided below to detailing example mechanisms for making uncommitted messages visible to the consumer that started the transaction. In some examples, the shards 718A-718B can be reused as the transaction buffer, or in other examples a separate/distinct shard can be used for it. Different implementation approaches along with their benefits and trade-offs are discussed later herein.

Figure 8:
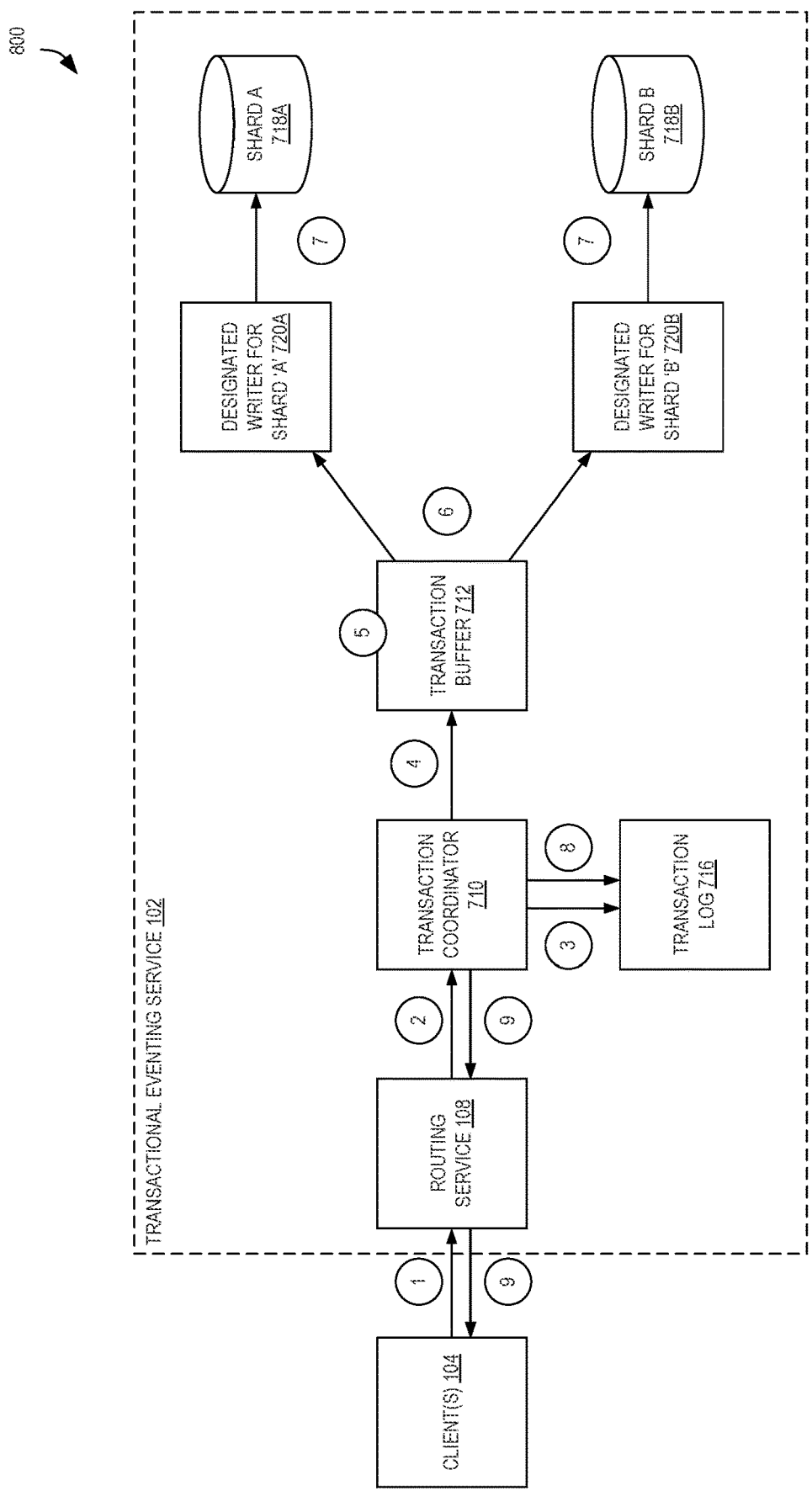
FIG. 8 is a diagram illustrating operations for performing transactional writes with a distributed log-based append-only datastore according to some examples.

FIG. 8 is a diagram illustrating operations 800 for performing transactional writes with a distributed log-based append-only datastore provided by a transactional eventing service according to some examples. In this figure, each arrow represents the request flow or event flow. These operations occur in sequence indicated by the circled numbers illustrated next to each arrow.

At circle (1), a client 104 sends one or more transaction request messages specifying one or more of a transaction timeout value (e.g., a maximum amount of time that the transaction coordinator 710 is to wait for a transaction to be completed by the client before proactively aborting the ongoing transaction), a set of stream IDs participating in the transaction, an aggregate identifier, and/or events with optional logical conditions indicating whether the events should or should not be accepted. For example, a condition could indicate that an item (corresponding to one in an event) must exist or must not exist prior to the transaction being performed, or that a particular aggregate (e.g., an abstraction corresponding to a collection of objects) must or must not exist, and/or that another object must exist or not exist, etc.

At circle (2), the request is dispatched by the routing service 108 to a transaction coordinator 710 responsible for the transaction, e.g., one belonging to a particular stream or shard that is associated with the transaction or user. At circle (3), the transaction coordinator 710 allocates a transaction ID for the transaction, which is persisted in the transaction log 716 with a status value of "OPEN," along with other metadata such as identifiers of the participating stream IDs, shard IDs, etc. At circle (4), the actual events associated with the transaction are sent to be stored in the transaction buffer 712, and at circle (5), events in the transaction buffer 712 participating in an ongoing transaction are locked from being observed in other transactions until the ongoing transaction is completed or aborted, which may include setting a particular lock value that is associated with these events, though other techniques can be used. The transaction coordinator 710 can be responsible to enforce this serializable isolation between transactions.

At circle (6), the transaction coordinator 710 can interact with the relevant shards and their designated writers (e.g., by sending commands 128) to commit the events in the transaction buffer 712, e.g., by updating records or writing records for the events to the shards 718A-718B as reflected by circle (7). If write conflicts exist, due to another ongoing transaction being in the process of updating the same events as detected via a built-in OCC mechanism, or due to a condition supplied in one of the event condition expressions not being met, the transaction can be aborted and the corresponding events in the transaction buffer 712 may be discarded. At circle (8), after all produced events to all shards 718 are committed or aborted, the transaction coordinator 710 updates the final transaction status message (e.g., COMMITTED or ABORTED) in the transaction log 716 indicating that the transaction is complete, and at circle (9) the client 104 is notified about the final transaction status.

Figure 9:
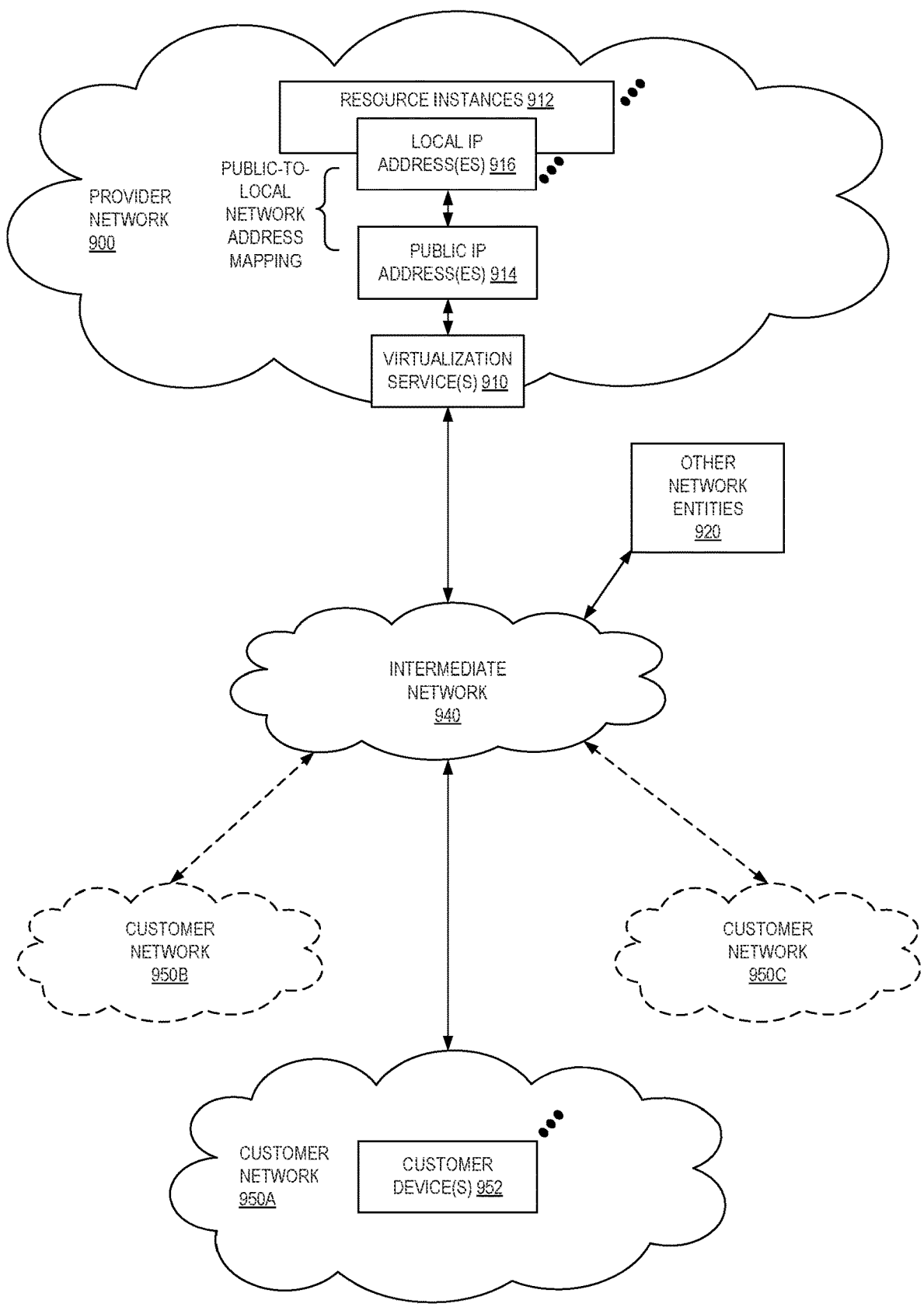
FIG. 9 illustrates an example provider network environment according to some examples.

FIG. 9 illustrates an example provider network (or "service provider system") environment according to some examples. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some examples, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
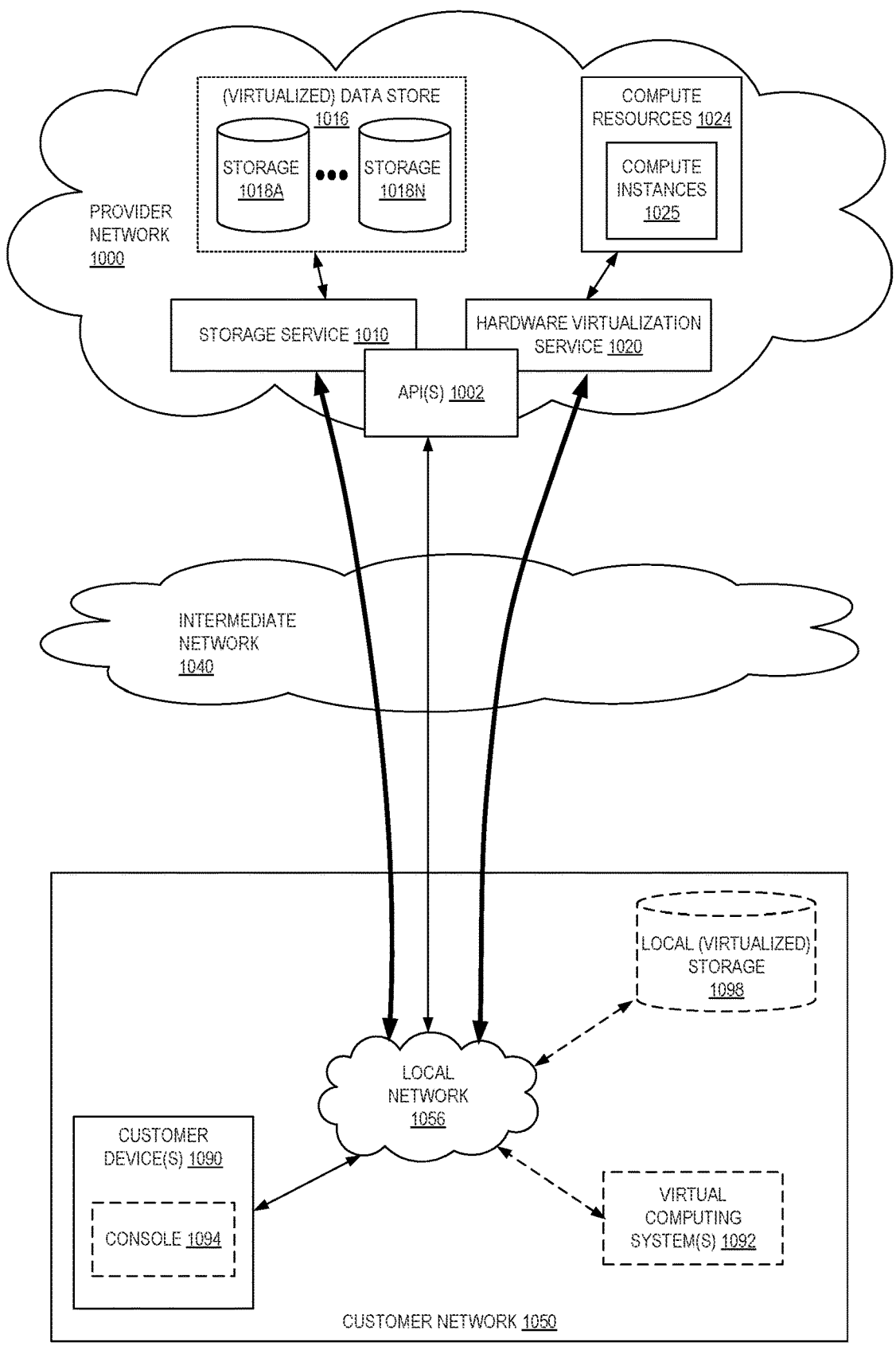
FIG. 10 is a block diagram of an example provider network that provides a storage service and a hardware virtualization service to customers according to some examples.

FIG. 10 is a block diagram of an example provider network environment that provides a storage service and a hardware virtualization service to customers, according to some examples. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some examples, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some examples, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual datastore 1016 (e.g., a folder or "bucket," a virtualized volume, a database, etc.) provided by the provider network 1000. In some examples, a virtualized datastore gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized datastore 1016) is maintained. In some examples, a user, via the virtual computing system 1092 and/or another customer device 1090, can mount and access virtual datastore 1016 volumes via the storage service 1010 acting as a storage virtualization service, and these volumes can appear to the user as local (virtualized) storage 1098.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.

Illustrative Systems

Figure 11:
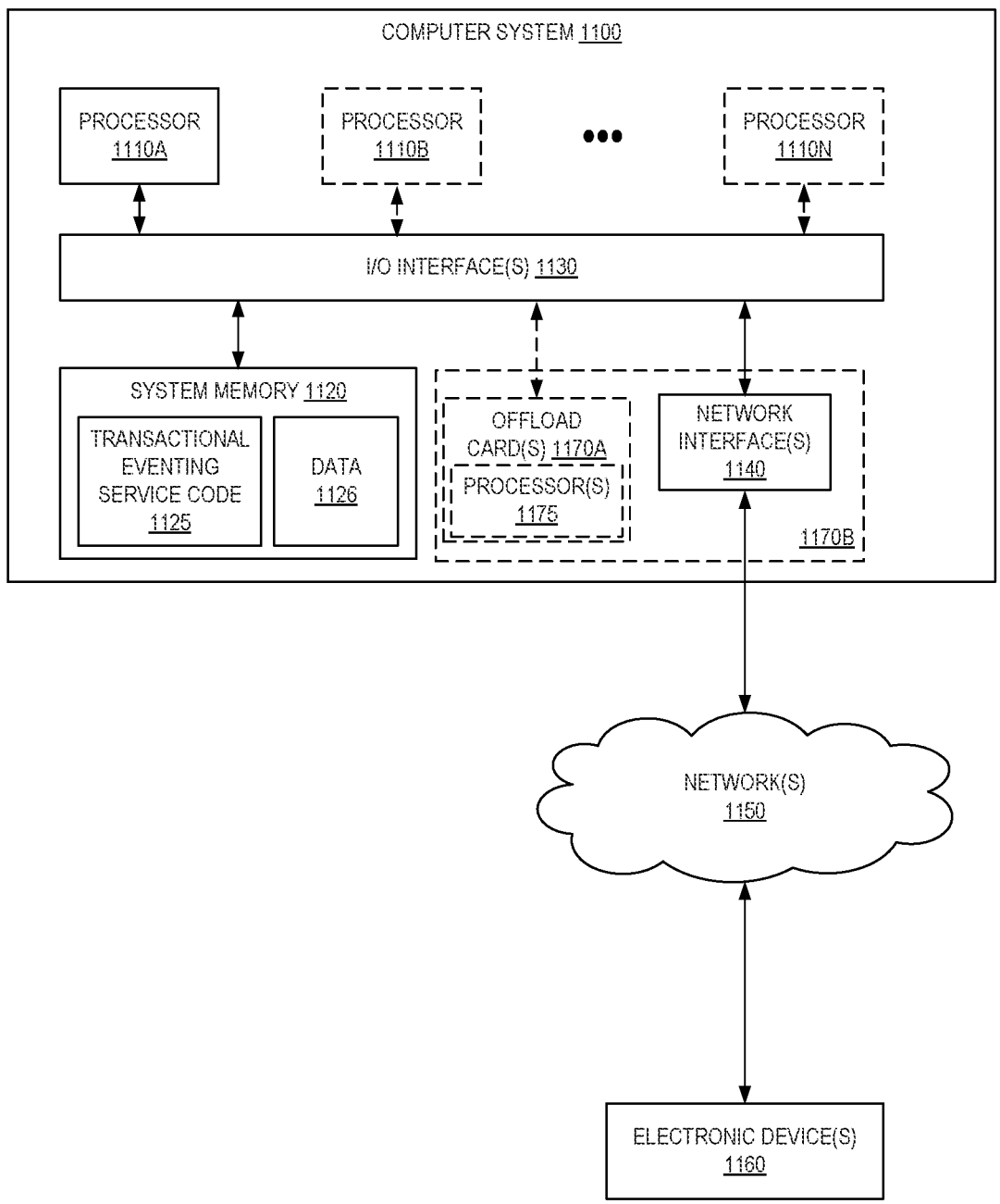
FIG. 11 is a block diagram illustrating an example computer system that can be used in some examples.

In some examples, a system that implements a portion or all of the techniques described herein can include a general-purpose computer system, such as the computer system 1100 illustrated in FIG. 11, that includes, or is configured to access, one or more computer-accessible media. In the illustrated example, the computer system 1100 includes one or more processors 1110 coupled to a system memory 1120 via an input/output (I/O) interface 1130. The computer system 1100 further includes a network interface 1140 coupled to the I/O interface 1130. While FIG. 11 shows the computer system 1100 as a single computing device, in various examples the computer system 1100 can include one computing device or any number of computing devices configured to work together as a single computer system 1100.

In various examples, the computer system 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various examples, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various examples, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1120 as transactional eventing service code 1125 (e.g., executable to implement, in whole or in part, the transactional eventing service 102, for example, code to partially or completely implement a node 'A20) and data 1126.

In some examples, the I/O interface 1130 can be configured to coordinate I/O traffic between the processor 1110, the system memory 1120, and any peripheral devices in the device, including the network interface 1140 and/or other peripheral interfaces (not shown). In some examples, the I/O interface 1130 can perform any necessary protocol, timing, or other data transformations to convert data signals from one component (e.g., the system memory 1120) into a format suitable for use by another component (e.g., the processor 1110). In some examples, the I/O interface 1130 can include support for devices attached through various types of peripheral buses, such as a variant of the Peripheral Component Interconnect (PCI) bus standard or the Universal Serial Bus (USB) standard, for example. In some examples, the function of the I/O interface 1130 can be split into two or more separate components, such as a north bridge and a south bridge, for example. Also, in some examples, some or all of the functionality of the I/O interface 1130, such as an interface to the system memory 1120, can be incorporated directly into the processor 1110.

The network interface 1140 can be configured to allow data to be exchanged between the computer system 1100 and other devices 1160 attached to a network or networks 1150, such as other computer systems or devices as illustrated in FIG. 1, for example. In various examples, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect—Express (PCI-E) standard, or another interconnect such as a QuickPath interconnect (QPI) or UltraPath interconnect (UPI)). For example, in some examples the computer system 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some examples the offload card(s) 1170A or 1170B can perform compute instance management operations, such as pausing and/or un-pausing compute instances, launching and/or terminating compute instances, performing memory transfer/copying operations, etc. These management operations can, in some examples, be performed by the offload card(s) 1170A or 1170B in coordination with a hypervisor (e.g., upon a request from a hypervisor) that is executed by the other processors 1110A-1110N of the computer system 1100. However, in some examples the virtualization manager implemented by the offload card(s) 1170A or 1170B can accommodate requests from other entities (e.g., from compute instances themselves), and can not coordinate with (or service) any separate hypervisor.

In some examples, the system memory 1120 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1100 via the I/O interface 1130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C # or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of datastores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1018A-1018N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    adding a node to a cluster of nodes utilizing a log-based datastore based on a determination to scale out the cluster or a determination that another node that was or is in the cluster has experienced a failure or performance issue;
    updating a local state of the node to be current, wherein the local state is derived based on a sequence of updates to the log-based data store, the updating comprising:
        obtaining, by the node, checkpointed data from a durable datastore, wherein the checkpointed data corresponds to the local state;
        updating, by the node, a local data structure based on the obtained checkpointed data;
        attaching, by the node, to the log-based datastore at a specific location identified based on the checkpointed data; and
        replaying one or more updates, obtained from the log-based datastore via the attachment, to further update the local data structure to be current; and
    determining, by the node based on a leader election process, that the node is to act as a designated writer node of the cluster that controls the updating of the log-based datastore based on use of the local state; and
    switching, by the node, into a designated writer mode of operation.

2. The computer-implemented method of claim 1, further comprising:
    identifying, by the node via use of the durable datastore, an identifier of a most recently checkpointed entry corresponding to the local state; and
    executing, by the node, a checkpointing process based at least in part on use of the identifier of the most recently checkpointed entry, the checkpointing process comprising:
        iterating through entries in the local data structure to identify one or more entries that have been updated after the most recently checkpointed entry.

3. The computer-implemented method of claim 2, wherein the checkpointing process is non-blocking and thus occurs while the local data structure remains actively used and updated.

4. A computer-implemented method comprising:
    obtaining, by a node in a cluster of nodes utilizing a log-based datastore, checkpointed data from a durable datastore, wherein the checkpointed data corresponds to local state derived from a sequence of updates to the log-based datastore;
    updating, by the node, a local data structure based on the obtained checkpointed data;
    attaching, by the node, to the log-based datastore at a specific position identified based on the checkpointed data; and
    replaying one or more updates, obtained from the log-based datastore via the attachment, to further update the local data structure to be current.

5. The computer-implemented method of claim 4, further comprising adding the node to the cluster, prior to the obtaining of the checkpointed data, as part of a horizontal scaling of the cluster or based on determining that another node of the cluster has experienced a failure or performance issue.

6. The computer-implemented method of claim 5, further comprising:
    participating, by the node, in a leader election process to determine which node of the cluster is to serve as a designated writer node, wherein the other nodes of the cluster are to act as follower nodes.

7. The computer-implemented method of claim 4, further comprising:
    identifying, by the node via use of the durable datastore, an identifier of a most recently checkpointed entry corresponding to the local state; and
    executing, by the node, a checkpointing process based at least in part on use of the identifier of the most recently checkpointed entry, the checkpointing process comprising:
        iterating through entries in the local data structure to identify one or more entries that have been updated after the most recently checkpointed entry.

8. The computer-implemented method of claim 7, wherein for each entry identified during the iterating, the node is to lock the entry, create a deep copy of the entry while the entry is locked, unlock the entry, and transmit an update to the durable datastore generated based on use of the copy of the entry.

9. The computer-implemented method of claim 7, wherein the local data structure provides constant time access to the entry having a minimum key.

10. The computer-implemented method of claim 7, wherein the checkpointing process is non-blocking and occurs while the local data structure remains actively used and updated.

11. The computer-implemented method of claim 4, wherein the local data structure comprises a first data structure that stores dirty local state that has not yet been checkpointed and further comprises a second data structure that stores local state that has been checkpointed, and wherein the method further comprises:
  executing, by the node, a checkpointing process via use of the first data structure.

12. The computer-implemented method of claim 4, further comprising:
  executing, by the node, a checkpointing process, comprising:
    performing an atomic swap to cause a second local data structure to be used for controlling updates to the log-based datastore in place of the initial local data structure; and
    utilizing the initial local data structure to generate updates to be transmitted to the durable datastore.

13. The computer-implemented method of claim 4, further comprising:
  identifying, from the checkpointed data, a data sequence number associated with a change made in the log-based datastore, wherein attaching to the to the log-based datastore comprises opening a stream using the data sequence number.

14. The computer-implemented method of claim 4, further comprising:
  receiving a user-provided input indicating a type of checkpointing to be performed by the cluster, wherein the type is one of compute optimized or memory optimized; and
  configuring at least the node of the cluster to perform a checkpointing process based at least in part on the user-provided input.

15. The computer-implemented method of claim 4, wherein the cluster of nodes are implemented by a transactional eventing service of a multi-tenant cloud provider network, and wherein the local state is utilized to perform admission control for updates to the log-based datastore.

16. A system comprising:
  a first one or more electronic devices to implement a log-based datastore in a multi-tenant provider network; and
  a second one or more electronic devices to implement a cluster of nodes in the multi-tenant provider network, wherein a first node of the cluster includes instructions that upon execution cause the first node to:
    obtain checkpointed data from a durable datastore, wherein the checkpointed data corresponds to local state derived from a sequence of updates to the log-based datastore;
    update a local data structure based on the obtained checkpointed data;
    attach to the log-based datastore at a specific position based on use of the checkpointed data; and
    replay one or more updates, obtained from the log-based datastore via the attachment, to further update the local data structure to be current.

17. The system of claim 16, wherein the first node is added to the cluster, prior to the obtaining of the checkpointed data, as part of a horizontal scaling of the cluster or based on a determination that another node of the cluster has experienced a failure.

18. The system of claim 17, wherein the first node further includes instructions that upon execution cause the first node to:
  participate in a leader election process to determine which node of the cluster is to serve as a designated writer node, wherein the other nodes of the cluster are to act as follower nodes.

19. The system of claim 16, wherein the first node further includes instructions that upon execution cause the first node to:
  identify, via use of the durable datastore, an identifier of a most recently checkpointed entry corresponding to the local state; and
  execute, by the first node, a checkpointing process based at least in part on use of the identifier of the most recently checkpointed entry, the checkpointing process comprising:
    iterating through entries in the local data structure to identify one or more entries that have been updated more recently than the most recently checkpointed entry.

20. The system of claim 19, wherein for each entry identified during the iterating, the node is to lock the entry, create a deep copy of the entry while the entry is locked, unlock the entry, and transmit an update to the durable datastore generated based on use of the copy of the entry.

* * * * *